United States Patent [19]

Blickle et al.

[11] Patent Number: 4,808,651
[45] Date of Patent: Feb. 28, 1989

[54] SOLUTIONS OF FLUOROPOLYMERS, AND THEIR USE

[75] Inventors: Peter Blickle, Kelkheim; Klaus Hintzer; Gernot Löhr, both of Burgkirchen; Werner Schwertfeger, Langgöns, all of Fed. Rep. of Germany

[73] Assignee: Hoechst Aktiengesellschaft, Frankfurt am Main, Fed. Rep. of Germany

[21] Appl. No.: 96,653

[22] Filed: Sep. 15, 1987

[30] Foreign Application Priority Data

Sep. 17, 1986 [DE] Fed. Rep. of Germany ....... 3631561

[51] Int. Cl.⁴ .............................................. C08J 5/06
[52] U.S. Cl. .................................................... 524/366
[58] Field of Search .......................................... 524/366

[56] References Cited

U.S. PATENT DOCUMENTS 3,740,369 6/1973 Proskow .............................. 524/366

Primary Examiner—Joseph L. Schoter
Assistant Examiner—Peter D. Mulcahy

[57] ABSTRACT

The invention relates to solutions of fluoropolymers which preferably contain carbonate groups, in solvents of the general formula (I)

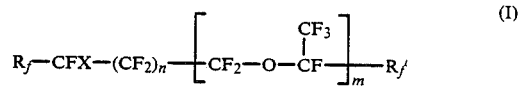

These solutions are suitable, in particular, for the production of membranes for liquid permeation processes, such as electrolysis.

25 Claims, No Drawings

SOLUTIONS OF FLUOROPOLYMERS, AND THEIR USE

It is known that fluoropolymers having functional groups, such as carbonate or sulfonic acid groups, are soluble in perfluorokerosine, "Halocarbon oils" (perhalogenated alkyl polymers having a low molecular weight, for example of chlorotrifluoroethylene, manufacturer: Halocarbon Products Corp., Hackensack N.J., U.S.A.) or perfluoroethers (cf. WO-81/01,158). However, such solvents have extremely high boiling points of more than 200° C., which requires a high thermal load on the polymer on evaporation. In addition, a number of fluoropolymers having ester groups, for example those described in EP-A-0,088,285 and EP-A-0,171,696, are only sparingly soluble in Halocarbon oils.

In addition, perfluoroethers having carbonate or sulfonyl fluoride groups are described in German Offenlegungsschrift No. 3,036,410 as solvents for fluoropolymers containing sulfonyl fluoride or carbonate groups. The disadvantages of these solvents are that their reactive groups are not acid- and base-stable, transesterifications can occur, and corrosion phenomena on apparatuses are to be feared, for example through the production of hydrogen fluoride (hydrolysis of SO$_2$F groups, inter alia).

The object of the present invention was therefore to provide a solvent for fluoropolymers or corresponding solutions which do not have the above disadvantages and which dissolve fluoropolymers, as described, for example, in EP-A-0,088,285, which contain either non-polar or polar groups equally well.

The invention relates to a solution of a fluoropolymer in a halogen-containing solvent, wherein the solvent has the general formula (I)

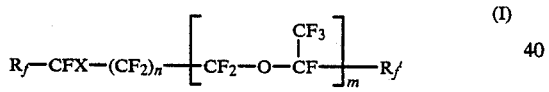

in which, independently of one another, $R_f$ may denote F or perfluoroalkyl having 1-3 carbon atoms, X may denote hydrogen or halogen, preferably hydrogen, F, Cl or Br, n may denote an integer from 0-10, preferably 0-6, in particular 1-5, m may denote a number from 0-5, preferably 0-3, in particular 0-2, and $R_f'$ may denote $$-CF_2-O-CFY-CF_2Y, -CFY-CF_2Y, -CF_2Y \text{ or} $$
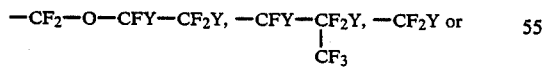
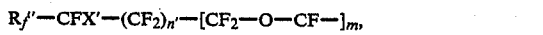

in which $R_f''$, n' and m' have the same meaning as $R_f'$, n and m, X' represents hydrogen, Cl, Br or I, preferably hydrogen, Cl or Br, and Y represents hydrogen, Cl or Br, preferably Cl or Br, with the proviso that the boiling point of this solvent at atmospheric pressure is at most 190° C., if at least one of the radicals X, X' or Y does not represent hydrogen, and with the further proviso that, where $R_f'$ equals —CFY—CF$_2$Y or —CF$_2$Y, m denotes only 0.

The invention furthermore relates to the use of such a solution for the production or repair of membranes which are employed, in particular, for liquid permeation processes.

The boiling point of the solvent employed according to the invention is preferably at most 180° C. and is, in particular between 50° C. and 180° C., all data relating to atmospheric pressure.

The following may be mentioned as examples of solvents of the above formula (I):

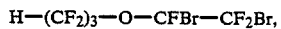

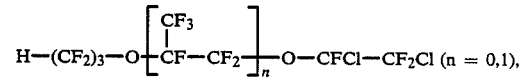

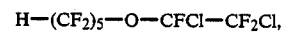

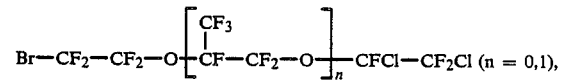

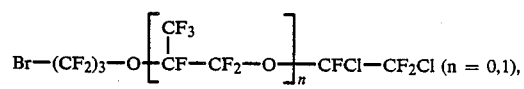

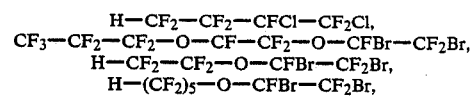

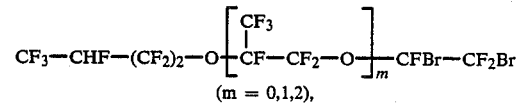

$(m = 0,1,2)$,

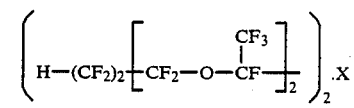

Preferred representatives are:

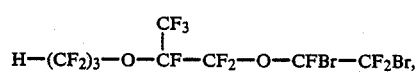

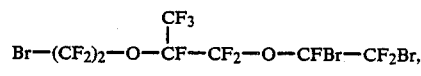

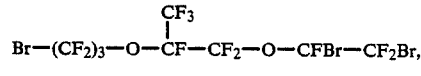

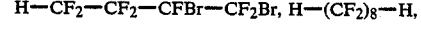

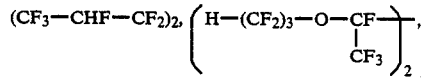

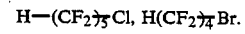

Of course, mixtures of the solvents according to formula (I) can also be employed in the context of the invention.

These solvents are prepared analogously to known synthetic processes. Solvents of the general formula (I) in which $R_f'$ represents CF$_2$—O—CFY—CF$_2$Y or CFY—CF₂Y can be obtained, for example, by the addition reaction of chlorine or bromine with unsaturated compounds of the general formula (II)

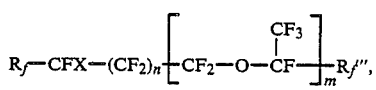
(II)

in which $R_f$, X, n and m have the abovementioned meanings and $R_f'''$ is —CF₂—O—CF=CF₂ or —CF=CF₂.

The vinyl ether of this general formula II ($R_f'''$ =—CF₂—O—CF=CF₂) can easily be prepared, for example by the reaction sequence below:

$$R_f\text{—CFX—(CF}_2)_n\text{—COF} \quad (III)$$

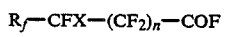

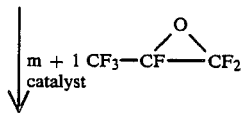
(IV)

$$R_f\text{—CFX—(CF}_2)_n\left[\text{CF}_2\text{—O—}\underset{|}{\overset{CF_3}{CF}}\right]_m\text{CF}_2\text{—O—}\underset{|}{\overset{CF_3}{CF}}\text{—COF}$$

1. saponification
2. pyrolysis of the salt $$R_f\text{—CFX—(CF}_2)_n\left[\text{CF}_2\text{—O—}\underset{|}{\overset{CF_3}{CF}}\right]_m\text{CF}_2\text{—O—CF=CF}_2 \quad (V)$$

Regarding further details, reference is made to Angew. Chem. 97, 164 (1985) and R. E. Banks, Preparation, Properties and Ind. Appl. of Organofluorine Compounds, Ellis Horwood Ltd., 1982, page 257, and the simultaneously filed German Patent Application No. P 3,631,560.5.

Olefins of the general formula II ($R_f'''$ =—CF=CF₂) where m equals 0 can be obtained, for example, by pyrolysis of Na salts:

$$R_f\text{—CFX—(CF}_2)_n\text{—CF}_2\text{—CF}_2\text{—COONa} \quad (VI)$$
$$\downarrow \Delta$$
$$R_f\text{—CFX—(CF}_2)_n\text{—CF=CF}_2 \quad (VII)$$

In this regard, see, for example, "Aliphatic Fluorine Compounds", (Lovelace, Rausch, Postelnek, Reinhold Publ. Corp.), 1958, page 107 and J. of Fluorine Chemistry 13 (1979), pp. 531 ff.

Solvents of the general formula (I) in which $R_f$ is F, X is H, n is 1, 3, 5, 7 etc., m is 0 and $R_f'$ is CF₂Y are prepared, for Y=Cl, by pyrolysis of difluorochloromethane, in which case they are produced as by-products (Ind. Eng. Chem. 39, 354 (1947));

for Y=Cl or Br, by the action of light on appropriate fluorinated carbonyl halides (J. Org. Chem. 30, 2182 (1965));

for Y=hydrogen, by hydrogenation of appropriate fluorinated olefins, cf., for example "Organic Fluorine Chemistry" (M. Hudlicky; Plenum Press), 1971, pp. 89 ff.

Compounds of the general formula (I) where $R_f'$=

$$R_f''\text{—CFX'—(CF}_2)_{n'}\left[\text{CF}_2\text{—O—}\underset{|}{\overset{CF_3}{CF}}\right]_{m'}$$

can be obtained by Kolbe electrolysis. When two different carboxylic acids are used, Kolbe products can be prepared which are not constructed symmetrically:

$$R_f\text{—CFX—(CF}_2)_n\left[\text{CF}_2\text{—O—}\underset{|}{\overset{CF_3}{CF}}\right]_m\text{—COOH} \quad (VIII)$$

Zh. Obsh. Khim. 35 1778 (1965)
$$\downarrow \text{Kolbe electrolysis}$$

$$R_f\text{—CFX—(CF}_2)_n\left[\text{CF}_2\text{—O—}\underset{|}{\overset{CF_3}{CF}}\right]_m\left[\underset{|}{\overset{CF_3}{CF}}\text{—O—CF}_2\right]_{m'}\text{(CF}_2)_{n'}\text{—CFX'—}R_f'' \quad (IX)$$

The fluoropolymers of the solutions according to the invention are known products, as described, for example, in German Offenlegungsschrift No. 2,905,457, German Offenlegungsschrift No. 3,036,410, EP-A-0,066,369, EP-A-0,088,285 and WO-91/01,158.

They preferably contain the groups

—SO₂F (A)

and/or

—CG (B)

(G=nitrogen, —OOR or —ON(R)₂, where R represents C₁-C₁₀-alkyl, aryl or aralkyl, preferably C₁-C₁₈-alkyl) the groups (B) being preferred. The group (B) preferably denotes —COOR.

Particularly preferred fluoropolymers according to the invention are those which contain the repeating units having the general formula (C), either alone or together with other repeating units:

$$\underset{|}{\overset{|}{\underset{CF\!\!-\!\!(\!\!O\!\!-\!\!CF_2\!\!-\!\!CF\!\!)_{\overline{u}}\!\!O_{v}\!\!-\!\!(CF_2)_{\overline{w}}CDFB'}{\overset{CF_2}{|}}}} \quad \overset{A'}{\underset{|}{}} \quad (C)$$

in which
u denotes 0, 1 or 2, preferably 0 or 1,
v denotes 0 or 1, preferably 1,
w denotes 1-7, preferably 2-5, A' and B', independently of one another, denote F or CF$_3$, A' preferably denotes CF$_3$ and B' preferably denotes F, and D denotes hydrogen, Cl, Br, CG (G has the same meaning as above) and, less preferably, SO$_2$F.

These repeating units (C) can build up the fluoropolymer, if appropriate mixed with one another. However, further repeating units of the general formula (D)

$$-CF_2-CFE- \qquad (D)$$

in which E represents Cl, F, R$_f$ or OR$_f$ (R$_f$=CF$_3$ or a C$_2$-C$_8$-perfluoroalkyl radical which is optionally interrupted by oxygen atoms), are preferably located in this fluoropolymer. E preferably denotes F, CF$_3$, —O—CF$_2$—CF$_2$—CF$_3$ or $$-O-CF_2-\underset{\underset{CF_3}{|}}{CF}-O-CF_2-CF_2-CF_3$$

and, in particular, F.

Here too, these repeating units can optionally be present in mixtures. In the context of these fluoropolymers, those are preferred which comprise the repeating unit (C)

$$-CF_2-\underset{\underset{O-CF_2-CF_2-CF_2H}{|}}{CF}- \quad \text{or}$$

$$-CF_2-\underset{\underset{O-CF_2-CF_2-COOR}{|}}{CF}-$$

and the repeating unit (D) —CF$_2$—CF$_2$— in the case of bipolymers or —CF$_2$—CF$_2$— and —CF—CFE— (E=the above meaning with the exception of F) in the case of terpolymers. The content of (C) in the case of bi- and terpolymers is 10 to 50 mol-%, preferably 13 to 45 mol-%, relative to the total polymer.

Examples of monomers leading to thee repeating units (C) are:

CF$_2$=CFOCF$_2$CF$_2$SO$_2$F, CF$_2$=CFOCF$_2$CFOCF$_2$CF$_2$SO$_2$F,
$\qquad\qquad\qquad\qquad\qquad\qquad\qquad$ |
$\qquad\qquad\qquad\qquad\qquad\qquad\qquad$ CF$_3$ CF$_2$=CFOCF$_2$CFOCF$_2$CFOCF$_2$CF$_2$SO$_2$F,
$\qquad\qquad\qquad$ | $\qquad\quad$ |
$\qquad\qquad\qquad$ CF$_3$ $\qquad\;$ CF$_3$ CF$_2$=CFCF$_2$CF$_2$SO$_2$F,
CF$_2$=CFO(CF$_2$)$_{1-6}$COOCH$_3$, CF$_2$=CF(CF$_2$)$_{0-8}$COOCH$_3$ CF$_2$=CF—[O—CF$_2$—CF]$_{0-2}$—O—(CF$_2$)$_{1-6}$—CF$_2$H,
$\qquad\qquad\qquad\qquad$ |
$\qquad\qquad\qquad\qquad$ CF$_3$ CF$_2$=CFOCF$_2$CF(CF$_3$)OCF$_2$CF$_2$COOCH$_3$,
CF$_2$=CF—O—CF$_2$CF(CF$_3$)O(CF$_2$)$_3$COOCH$_3$,
$\qquad\quad$ CF$_2$=CF—O—CF$_2$CF(CF$_3$)OCF$_2$COOCH$_3$ In connection with the repeating unit (D), examples which can be mentioned are tetrafluoroethylene, trifluorochloroethylene, hexafluoropropene, perfluoro(propyl vinyl ether) and perfluoropropoxy(propyl vinyl ether).

The preparation of such fluoropolymers which are particularly preferred according to the invention and which comprise (C) and, if appropriate, (D) is described, for example, in EP-A-0,088,285 and EP-A-0,171,696.

The molecular weight (number average) of the fluoropolymers according to the invention is generally between 50,000 and 1,000,000, preferably between 100,000 and 500,000. The equivalent weight (in the presence of groups (A) and/or (B)) is 400 to 1,800, preferably 450 to 1,500.

Solutions, according to the invention, of the fluoropolymers can be prepared at temperatures from 20° C. to the boiling point of the particular solvent, preferably at temperatures from 50° C. to 10° C. below the boiling point. If appropriate, the preparation can also be carried out under superatmospheric pressure in order to achieve higher temperatures. However, atmospheric pressure is generally preferred. It is of advantage to aid the dissolution process by subjecting the solution to stirring or similar and employing the fluoropolymer in the most finely divided form possible. The concentration (the solids content) of the solutions according to the invention is generally between 0.5 and 30% by weight, preferably between 1 and 25% by weight.

The solutions according to the invention are distinguished, above all, by their stability due to the lacking of functional groups in the solvent, the capability of the solvent for dissolving polymers with or without polar groups equally well, their high solids content due to the good dissolution properties of the solvents and the fact that molded articles (membranes) can be produced from them without relatively high thermal load of the fluoropolymer.

The solutions according to the invention can be employed in a very wide variety of areas, as described, for example, in German Offenlegungsschrift No. 2,905,467, German Offenlegungsschrift No. 3,036,410 and EP-A-0,066,369. They are preferably used for the production or repair of membranes, in particular for liquid permeation processes, as arise in ultra- or hyperfiltration, dialysis (reverse osmosis), electrolysis, in particular of aqueous sodium chloride solutions, and in fuel cells. Further areas of application are membranes for ion exchange processes, for mass transport and for catalytic purposes.

In order to produce these membranes, the solution is cast or a porous substrat, such as nets, fabrics or porous sheets etc., is impregnated with the solution. If necessary, the groups (A) and/or (B) are subsequently converted into the acid or salt form in a known fashion.

The solutions according to the invention can also be used effectively for repair of membrane defects, such as pinholes. In some cases, merely the solvent according to the invention itself is sufficient for this, after any functional groups which may be present have been converted into a derivative which is suitable for dissolution.

In addition, the solutions according to the invention can also be used for rendering non-wettable surfaces wettable (if groups (A) and/or (B) are present, if necessary after their hydrolysis) or for obtaining the fluoropolymer in finely divided form after addition of nonsolvents to the solution.

EXAMPLES

I. Preparation of the solvents

1. $\quad$ R$_f'$=CF$_2$—O—CFBr(Cl)—CF$_2$Br(Cl) $\qquad$ or CFBr(Cl)—CF$_2$Br(Cl).

(a) The vinyl ether or the olefin was introduced into a glass flask equipped with a magnetic stirrer, reflux condenser and dropping funnel. While irradiating with a daylight-balanced lamp, bromine was added dropwise until decoloration no longer occurred. The internal temperature was kept between 20° and 100° C. through cooling with ice. The batch was worked up either by washing with sodium hydroxide solution and water and subsequently drying over P$_2$O$_5$ with subsequent distillation or by direct distillation of the reaction mixture.

(b) The chlorination of vinyl ethers and olefins was carried out in the apparatus described above in which the reflux condenser was replaced by a low-temperature condenser and the dropping funnel by a gas-inlet tube. Chlorine was passed in at 0°-40° C. until a lasting yellow color was produced. The batch was worked up as described in the case of the bromination.

In the following table, a number of "dibromides" and "dichlorides" which were obtained by this route are collated:

decane (8) were prepared from the corresponding carboxylic acids (1), (3), (5) and (7) by Kilbe electrolysis:

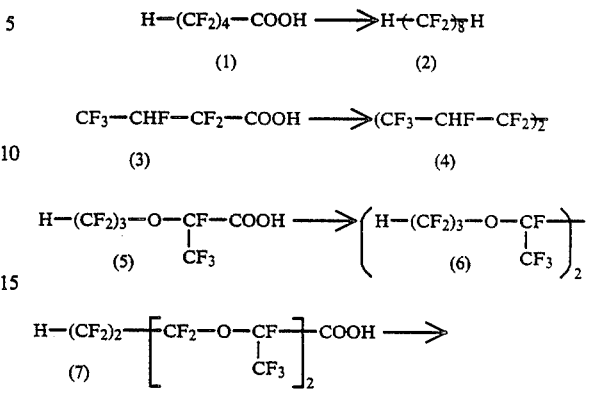

| "Dibromides" | b.p.: °C./mbar | Density at 23° C. [g/cm$^3$] | Yield % |
|---|---|---|---|
| H—(CF$_2$)$_3$—O—[CF(CF$_3$)—CF$_2$—O]$_n$—CFBr—CF$_2$Br | | | |
| n = 0 | 58–59°/80 | 2.02 | 92 |
| n = 1 | 83–84°/40 | 1.98 | 83 |
| H—CF$_2$—CF$_2$—O—CFBr—CF$_2$—Br | 57°/133 | 2.07 | 83 |
| H—(CF$_2$)$_5$—O—CFBr—CF$_2$Br | 68°/27 | 2.015 | 92 |
| CF$_3$—(CF$_2$)$_2$—O—[CF(CF$_3$)—CF$_2$—O]$_n$—CFBr—CF$_2$Br | | | |
| n = 0 | 109/1013 | 1.95 | 88 |
| n = 1 | 160/1013 | 1.97 | 85 |
| Br—(CF$_2$)$_2$—O—CF(CF$_3$)—CF$_2$—O—CFBr—CF$_2$Br | 77–80°/28 | | 80 |
| Br—(CF$_2$)$_3$—O—CF(CF$_3$)—CF$_2$—O—CFBr—CF$_2$Br | 114°/67 | | 79 |
| CF$_3$—CHF—(CF$_2$)$_2$—O—[CF(CF$_3$)—CF$_2$—O]$_m$—CFBr—CF$_2$Br | | | |
| m = 0 | 66–67°/64 | | 82 |
| m = 1 | 101°/67 | | 77 |
| m = 2 | 83–84°/6.7 | | 80 |
| H—CF$_2$—CF$_2$—CFBr—CF$_2$Br | 119°/997 | 2.17 | 83 |
| H—(CF$_2$)$_3$—O—CFCl—CF$_2$Cl | 99–100°/1013 | | 82 |
| H—(CF$_2$)$_5$—O—CFCl—CF$_2$Cl | 142–143°/1013 | | 75 |
| Br—CF$_2$—CF$_2$—O—CFCl—CF$_2$Cl | 107°/994 | | 81 |
| Br—(CF$_2$)$_3$—O—CF(CF$_3$)—CF$_2$—O—CFCl—CF$_2$Cl | 74–75°/27 | | 78 |
| H—CF$_2$—CF$_2$—CFCl—CF$_2$—Cl | 84°/997 | | 93 |

2. R$_f$'=R$_f$''—CFX'—(CF$_2$')$_{n'}$—[CF$_2$—O—CF(CF$_3$)]$_{m'}$ (Kolbe electrolysis)

The fluorinated hydrocarbons and ethers 1,8-dihydrohexadecafluorooctane (2), 2,5-dihydrododecafluorohexane (4) and 1,10-dihydro-5,6-bistrifluoromethyl-4,7-oxatetradecafluorodecane (6) and also hexa-

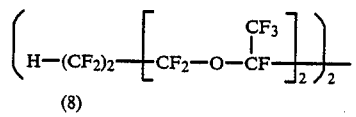

200 g (0.8 mol) of H—(CF$_2$)$_2$—COOH were electrolysed in an electrolyte comprising 330 ml of H$_2$O, 165 ml of CH$_3$OH and 2.5 g of NaOH in a glass electrolysis cell with platinum net electrodes (anode 59 cm$^2$) at a current strength of 14 to 8 A (5 F/mol). 500 ml of 1N NaOH were then added to the electrolyte, and the product phase was separated off; this was washed with water, dried over Na$_2$SO$_4$ and distilled. Yield of (2) 82.7%; b.p. 134° C. (Lit.: A. I. Levin, O. N. Chechina, S. V. Sokolov, Zh. Obsh. Khim. 35 [10] 1778-81 (1965).

The compounds (4), (6) and (8) were prepared in an analogous fashion in the same apparatus with the following yields:

(4) in 72% yield (b.p. 80°-82° C.)
(6) in 67% yield (b.p. 103°-104° C./233 mbar)
(8) in 80% yield (b.p. 110° C./26 mbar)

EXAMPLE 1

10 g of a fluoropolymer which was made from tetrafluoroethylene (TFE) and ω-hydroperfluoro(propyl vinyl ether) (HPPVE), which had been prepared according to Example 1 of EP-A-0,171,696 and which contained 21.5 mol-% of HPPVE, were stirred for 3 hours at 140° C. in 90 g of the solvent having the formula

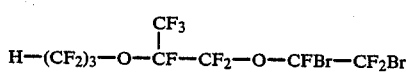

(b.p. 83°-84° C./40 mbar). A completely clear solution was produced from which, for example, excellent clear films could be produced.

EXAMPLE 2

The fluoropolymer from Example 1 was converted into the methyl ester form by the process described in Example 1 of EP-A-0,088,285. 10 g of such a fluoropolymer were stirred for 5 hours at 150° C. in 80 g of the solvent used in Example 1. A completely clear solution having a solids content of 11.1% by weight was obtained. From such a solution, films were produced which, after hydrolysis using NaOH, are used, for example, as ion exchanger membranes in chloralkali electrolysis. If such a membrane was used in an electrolysis cell which was provided with a titanium expanded metal anode and a V4A cathode, a current yield of 94% and a cell voltage of 3.45 V was obtained at a current density of 3,000 A/m$^2$, an anolyte concentration of 205 g of NaCl per liter of H$_2$O and a lye concentration of 36% of NaOH.

EXAMPLE 3

60 g of the solvent of the formula H—(CF$_2$)$_8$—H (b.p. 134° C.) were added to 5 g of the copolymer from Example 2. The mixture was stirred for 2 hours at 95° C., and a clear solution of the polymer was obtained. On chloralkali electrolysis, cast films of the latter exhibited electrochemical values as in Example 2 above.

EXAMPLE 4

30 ml of the solvent from Example 3 were added to 5 g of a terpolymer made from TFE/PPVE/HPPVE (76/8/16 mol-%) which had been converted into the methyl ester form (equivalent weight 912) corresponding to the process in Example 1 of EP-A-0,088,285. After stirring for 2 hours at 110° C., a clear solution was obtained. (PPVE=CF$_3$—CF$_2$—CF$_2$—O—CF=CF$_2$).

EXAMPLE 5

50 g of the solvent of the formula

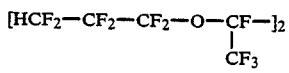

(b.p.: 150° C.) were added to 5 g of the copolymer from Example 2. The mixture was stirred for 2 hours at 100° C., and a clear solution of the polymer was obtained.

EXAMPLE 6

(Comparison)

150 g of the solvent of the formula

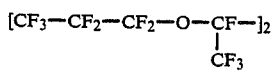

(b.p.: 134° C.) were added to 5 g of the copolymer from Example 2. The mixture was stirred for 7 hours at 120° C.; the polymer was merely very swollen, but not dissolved.

EXAMPLE 7

(Comparison)

100 g of Halocarbon oil 11-21 (manufacturer: Halocarbon Products Corp., Hackensack N.J., U.S.A.) were added to 5 g of the copolymer from Example 2. The polymer did not dissolve under the conditions specified in Example 5; it could only be dissolved after stirring for several hours at temperatures above 165° C.

EXAMPLE 8

90 g of the solvent H—(CF$_2$)$_4$—CF$_2$Cl (b.p.: 77° C.) were added to 5 g of the copolymer from Example 5. The mixture was stirred for 3 hours at 68° C., and a clear solution of the polymer was obtained. From this solution, films/foils were produced which, after hydrolysis using 25% strength NaOH, can be used, for example, as ion exchanger membranes in chloralkali electrolysis.

EXAMPLE 9

80 g of the solvent HCF$_2$—CF$_2$—CFBr—CF$_2$Br (b.p.: 119° C.) were added to 5 g of the copolymer from Example 5. The polymer dissolved while stirring for 2 hours at 90° C. to form a clear solution.

EXAMPLE 10

50 g of the solvent from Example 1 were added to 10 g of the terpolymer from Example 4. The mixture was stirred for 5 hours at 15° C., and a clear solution of the polymer was obtained.

We claim:
1. A solution of a fluoropolymer in a halogen-containing solvent, wherein the solvent has the formula (I)

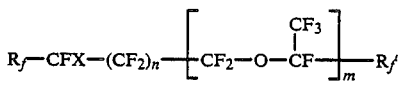 (I)

in which
R$_f$ denotes F or perfluoroalkyl having 1-3 carbon atoms,
X denotes hydrogen, F, Cl, Br or I,
n denotes an integer from 0-10,
m denotes a number from 0-5, and
R$_f'$ equals —CF$_2$—O—CFY—CF$_2$Y, —CFY—CF$_2$Y or —CF$_2$Y, or denotes

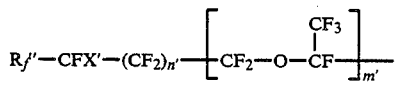

in which R$_f''$, n' and m' have the same meaning as R$_f$, n and m, X' denotes hydrogen, Cl, Br or I, and Y denotes Cl or Br,
with the proviso that the boiling point of this solvent at atmospheric pressure is at most 190° C. if at least one of the radicals X, X' or Y does not represent hydrogen, and with the further proviso that, where R$_f'$ equals —CFY—CF$_2$Y or CF$_2$Y, m denotes only 0.

2. A solution as claimed in claim 1, wherein X in the formula (I) denotes hydrogen, F, Cl or Br.

3. A solution as claimed in claim 1, wherein n represents an integer from 0 to 6 and m represents an integer from 0 to 3.

4. A solution as claimed in claim 1, wherein R$_f'$ has the meaning of

or

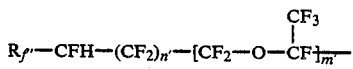

5. A solution as claimed in claim 1, wherein the boiling point of the solvent is at most 180° C.

6. A solution as claimed in claim 1, wherein the solids content of the fluoropolymer is 0.5 to 30% by weight.

7. A solution as claimed in claim 1, wherein the fluoropolymer contains at least repeating units (C)

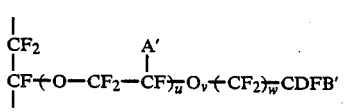 (C)

in which u denotes 0, 1 or 2, v denotes 0 or 1, w denotes 1 to 7, A' and B', independently of one another, denote F or CF$_3$ and D denotes hydrogen, Cl, Br or —COOR where R denotes C$_1$-C$_{10}$-alkyl.

8. A solution as claimed in claim 7, wherein u is at least equal to 0 and/or v is equal to 1 and wherein the content of units (C) is 10 to 50 mol-%.

9. A solution as claimed in claims 1, wherein the fluoropolymer also contains repeating units (D)

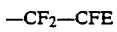 (D)

where E represents Cl, F, R$_f$ or OR$_f$, and R$_f$ denotes the CF$_3$ radical or a C$_2$-C$_8$-perfluoroalkyl radical which is optinally interrupted by oxygen atoms.

10. A solution as claimed in claim 1, wherein the fluoropolymer comprise the repeating unit (C)

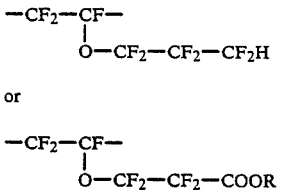

and the repeating unit (D) —CF$_2$—CF$_2$— in the case of bipolymers or —CF$_2$—CF$_2$— and —CF—CFE— (E=the above meaning with the exception of F) in the case of terpolymers.

11. A solution as claimed in claim 1, wherein the molecular weight (number average) of the fluoropolymers is between 50,000 and 1,000,000.

12. A solution as claimed in claim 1, wherein the fluoropolymer contains groups of the formula (A) and/or (B)

 (A)

 (B)

where G represents OOR where R equals C$_1$-C$_{10}$-alkyl.

13. Membrane produced from a solution as claimed in claim 1.

14. Membrane as claimed in claim 13 for liquid permeation processes or ion exchange processes.

15. Membrane as claimed in claim 14, wherein the liquid permeation process is electrolysis, in particular electrolysis of aqueous sodium chloride solution.

16. Membrane as claimed in claim 14, wherein the liquid permeation process is hyper- or ultrafiltration.

17. Repaired membrane obtained with a solution as claimed in claim 1.

18. Coatings on intert base materials prepared from a solution as claimed in claim 1.

19. A wettable surface obtained by treatment of a substrate containing a non-wettable surface with a solution as claimed in claim 12.

20. A solution as claimed in claim 1, wherein R$_f'$ is —CF$_2$—O—CFY—CF$_2$Y, —CFY—CF$_2$Y, or —CF$_2$Y.

21. A solution as claimed in claim 1, wherein X denotes hydrogen, Cl, or Br, and R$_f$ denotes F.

22. A solution as claimed in claim 1, wherein R$_f$ is

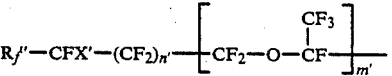

23. A solution as claimed in claim 22, wherein m' is zero.

24. A solution as claimed in claim 22 wherein X and X' are both hydrogen.

25. A solution as claimed in claim 23, wherein X and X' are both hydrogen.

* * * * *